US012665367B2

(12) United States Patent
Kimita et al.

(10) Patent No.: US 12,665,367 B2
(45) Date of Patent: Jun. 23, 2026

(54) METHOD OF MANUFACTURING ELECTRONIC COMPONENT AND ELECTRONIC COMPONENT

(71) Applicant: JAPAN AVIATION ELECTRONICS INDUSTRY, LIMITED, Tokyo (JP)

(72) Inventors: Youhei Kimita, Tokyo (JP); Hiroshi Akimoto; Takayuki Nishimura, Tokyo (JP); Kazuya Sakamoto, Tokyo (JP); Toru Nakatani, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 530 days.

(21) Appl. No.: 17/983,022

(22) Filed: Nov. 8, 2022

(65) Prior Publication Data

US 2023/0187888 A1 Jun. 15, 2023

(30) Foreign Application Priority Data

Dec. 9, 2021 (JP) ................................ 2021-199948

(51) Int. Cl.
*H01R 43/24* (2006.01)
*H01R 43/02* (2006.01)

(52) U.S. Cl.
CPC ............. *H01R 43/24* (2013.01); *H01R 43/02* (2013.01); *H01R 2201/26* (2013.01)

(58) Field of Classification Search
CPC ...... H01R 12/00; H01R 12/52; H01R 12/716; H01R 43/24; H01R 43/02; H01R 2201/26
See application file for complete search history.

(56) References Cited

U.S. PATENT DOCUMENTS 5,511,985 A * 4/1996 Noschese ........... H01R 12/7005 439/157
6,083,047 A * 7/2000 Paagman ........... H01R 13/6587 439/607.07

(Continued)

FOREIGN PATENT DOCUMENTS

CN 104051887 9/2014
CN 107000276 8/2017

(Continued)

OTHER PUBLICATIONS

Extended European Search Report Issued in Corresponding EP Patent Application No. 22206098.0, dated May 23, 2023.

(Continued)

*Primary Examiner* — Thanh Tam T Le
(74) *Attorney, Agent, or Firm* — Greenblum & Bernstein, P.L.C.

(57) ABSTRACT

Each terminal includes a tapered portion having a tapered width and an extension portion extending from a narrow-side distal end of the tapered portion. A method includes, after positioning the extension portion in one of grooves formed in one surface of each sliding die, sliding the sliding dies relative to the extension portion to make tip edges of opposite side surfaces of the groove facing the cavity abut against opposite side surfaces of the tapered portion; and performing molding while keeping the upper die in close contact with the one surface, and keeping part of the tapered portion and the extension portion lying in the groove held between a bottom surface of the groove and the upper die with a remaining portion of the tapered portion lying in the cavity, thus forming a connection portion protruding from the housing with the part of the tapered portion and the extension portion.

4 Claims, 12 Drawing Sheets

(56) References Cited

U.S. PATENT DOCUMENTS

| | | | | |
|---|---|---|---|---|
| 7,431,616 | B2 * | 10/2008 | Minich | H01R 13/514 439/607.05 |
| 7,758,378 | B2 * | 7/2010 | Yoshida | H01R 13/41 439/587 |
| 8,475,184 | B2 * | 7/2013 | Hasegawa | H01R 13/112 439/345 |
| 8,900,007 | B2 * | 12/2014 | Nonen | H01R 13/65917 439/497 |
| 9,980,025 | B2 * | 5/2018 | Klose | H01R 12/585 |
| 10,498,058 | B1 * | 12/2019 | Kitazawa | H01R 13/6594 |
| 11,431,132 | B2 * | 8/2022 | Teruki | H01R 12/716 |
| 11,489,291 | B2 * | 11/2022 | Oosaka | H01R 12/716 |
| 11,539,150 | B2 * | 12/2022 | Wu | H01R 12/58 |
| 11,539,170 | B2 * | 12/2022 | Oosaka | H01R 12/712 |
| 11,616,329 | B2 * | 3/2023 | Copper | H01R 27/00 439/708 |
| 11,621,527 | B2 * | 4/2023 | Chen | H01R 13/6598 439/607.01 |
| 11,735,867 | B2 * | 8/2023 | Chen | H01R 13/6585 439/607.05 |
| 2010/0178809 | A1 | 7/2010 | Tsai | |
| 2012/0052711 | A1 | 3/2012 | Hasegawa | |
| 2017/0093061 | A1 | 3/2017 | Lee et al. | |
| 2017/0310067 | A1 | 10/2017 | Omukai | |
| 2019/0348780 | A1 | 11/2019 | Kitazawa et al. | |
| 2021/0175665 | A1 | 6/2021 | Someya et al. | |
| 2021/0359471 | A1 | 11/2021 | Oosaka et al. | |

FOREIGN PATENT DOCUMENTS

| | | |
|---|---|---|
| CN | 113054490 | 6/2021 |
| JP | 5-74528 | 3/1993 |
| JP | H10-264163 A | 10/1998 |
| JP | 2000-150038 | 5/2000 |
| JP | 2005-251572 | 9/2005 |

OTHER PUBLICATIONS

Office Action issued in Corresponding KR Patent Application No. 10-2022-0139026, dated Apr. 16, 2024, along with an English translation thereof.

Office Action issued in Corresponding CN Patent Application No. 202211393649.5, dated Dec. 30, 2025, along with an English translation thereof.

* cited by examiner

RELATED ART

70

80

90

METHOD OF MANUFACTURING ELECTRONIC COMPONENT AND ELECTRONIC COMPONENT

TECHNICAL FIELD

The present invention relates to an electronic component having a housing with terminals insert-molded thereon and a method of manufacturing the electronic component.

BACKGROUND ART

FIG. 1(*a*) shows a connector 10 described in Japanese Patent Application Laid Open No. H10-264163 (hereinafter referred to as Patent Literature 1) as a conventional example of an electronic component of this type, and FIG. 1(*b*) is an enlarged illustration of its cross section. The connector 10 is structured with contacts 11 insert-molded on a housing (referred to as insulator in Patent Literature 1) 12. In FIG. 1, 11*a* indicates a lead portion of the contact 11, and 11*b* indicates a fitting portion of the contact 11.

FIG. 2 shows a contact member 15 for insertion into a mold, where multiple contacts 11 are provided in a corm-like form across slits between a lead-side frame 16 and a fitting-side frame 17.

FIG. 3 shows a state during mold pressing of an insert mold structure. In FIG. 3, 21 indicates a middle die plate, 22 indicates a basement on which the middle die plate 21 is integrally provided protruding therefrom, and 23 indicates a pair of sliding die plates which can move on the basement 22 into contact with and away from the opposite side surfaces of the middle die plate 21. Further, 24 indicates a movable die plate and 25 indicates a cavity.

The sliding die plates 23 are provided with first protrusions 26, which are oriented to enter the slits in the fitting portions 11*b* of the contact member 15, and second protrusions 27, which are oriented to enter the slits in the lead portions 11*a* of the contact member 15, as shown in FIG. 4. The contact member 15 is positioned by the first protrusions 26 and the second protrusions 27, and during mold pressing, the lead-side frame 16 and the fitting-side frame 17 are pressed and fixed by the movable die plate 24 and the sliding die plates 23, respectively. In FIG. 3, contact members 15 are indicated by bold lines.

After injecting resin into a cavity 25 and molding it, the mold is opened to remove the connector, and the lead portions 11*a* and the fitting portions 11*b* are cut into a certain length and snapped off, thus yielding the connector 10 shown in FIG. 1.

SUMMARY OF THE INVENTION

For an electronic component having terminals insert-molded on the housing, like the connector 10 mentioned above, the terminals need to be positioned at the time of molding so that the terminals are at predetermined positions. According to Patent Literature 1, the sliding die plates 23 are provided with the first protrusions 26 and the second protrusions 27, such that the contacts 11 are inserted into the grooves between the protrusions to be positioned.

However, in the case of thus inserting and positioning the terminals by providing grooves in the mold, setting a too narrow clearance (gap) between a terminal and a groove in the groove width direction degrades the insertability of the terminals into the grooves, which can cause the mold and the terminals to interfere with each other to damage the terminals, for example. Accordingly, the clearances between a terminal and a groove need to be large to a certain degree, in which case there can be a situation such as resin leaking from the clearances between the terminals and the grooves during molding.

The leaked resin creates resin burrs, which will be present over a portion of a terminal that protrudes from the housing. Thus, if the portion of the terminal that protrudes from the housing is a point of soldering to a land on a substrate, for example, soldering quality or strength could become insufficient due to the presence of the resin burrs. If the portion of the terminal that protrudes from the housing is a point of contact with a terminal of a mating electronic component, for example, contact quality could be compromised due to the presence of the resin burrs or the resin burrs could be scratched off at the time of contact to create chips.

In view of these circumstances, an object of the present invention is to provide a method of manufacturing an electronic component that can reduce formation of resin burrs, which adversely affect quality, and further an electronic component to which such a method of manufacture is applicable.

According to an embodiment of the present invention, a method of manufacturing an electronic component having a housing with terminals insert-molded thereon is provided, in which each of the terminals includes a tapered portion having a tapered width and an extension portion extending from a narrow-side distal end of the tapered portion, and a mold defining a cavity for molding the housing includes a first die and second dies. The method includes: after positioning the extension portion in one of grooves formed in one surface of each of the second dies, sliding the second dies relative to the extension portion to make tip edges of opposite side surfaces of the groove facing the cavity abut against opposite side surfaces that form tapering of the tapered portion; and performing molding while keeping the first die in close contact with the one surface, and keeping part of the tapered portion and the extension portion lying in the groove held between a bottom surface of the groove and the first die with a remaining portion of the tapered portion lying in the cavity, thus forming a connection portion protruding from the housing with the part of the tapered portion and the extension portion.

Effects of the Invention

According to the method of manufacturing an electronic component according to an embodiment of the present invention, resin leakage during insert molding of terminals on a housing can be prevented, and hence issues such as resin burrs forming at the connection portions of the terminals protruding from the housing due to resin leakage can be eliminated.

Moreover, since the electronic component according to an embodiment of the present invention has a configuration to which the method of manufacturing an electronic component according to an embodiment of the present invention is applicable, electronic components with no resin burrs at the connection portions of the terminals protruding from the housing can be yielded.

DETAILED DESCRIPTION OF THE EMBODIMENTS

An embodiment of the present invention is now be described with reference to the drawings in comparison with conventional structures.

Figure 1A:
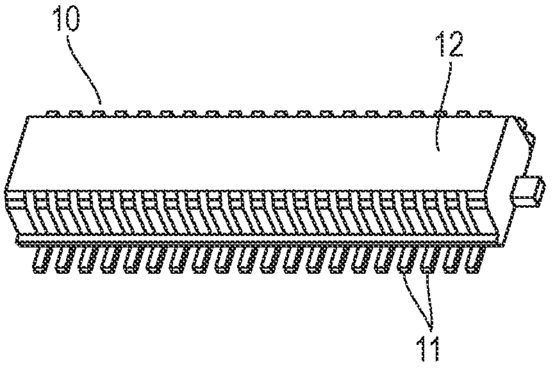
PRIOR ART FIG. 1(a)
FIG. 1(*a*) is a perspective view showing a conventional connector, and FIG. 1(*b*) is an enlarged sectional view of it.
Figure 1B:
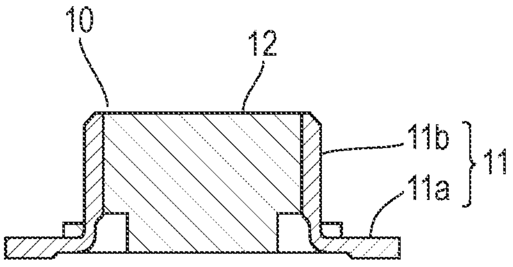
PRIOR ART FIG. 1(b)
Figure 2:
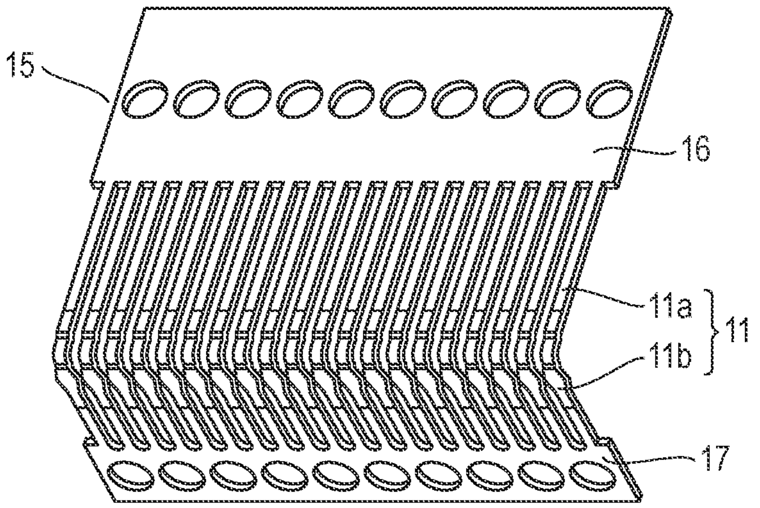
PRIOR ART FIG. 2
FIG. 2 is a perspective view showing a contact member used for manufacture of the connector shown in FIG. 1(*a*).
Figure 3A:
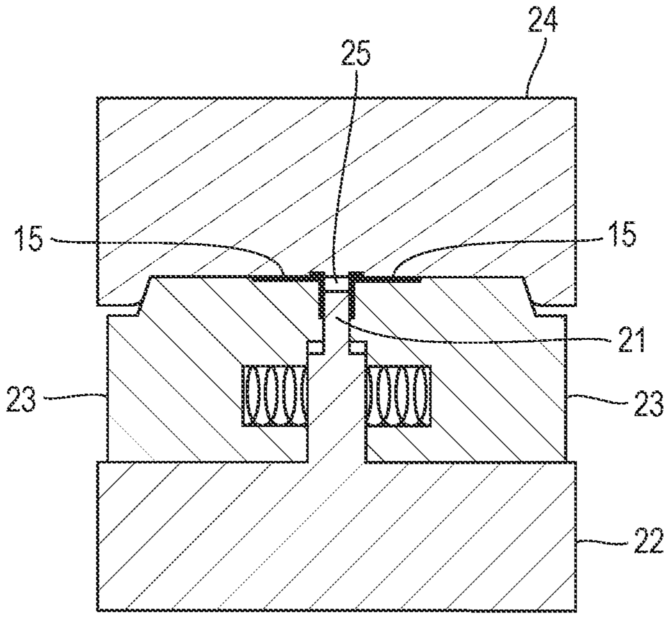
PRIOR ART FIG. 3(a)
FIG. 3(*a*) illustrates a mold structure for manufacturing the connector shown in FIG. 1(*a*), and FIG. 3(*b*) is a partial enlarged view of FIG. 3(*a*).
Figure 3B:
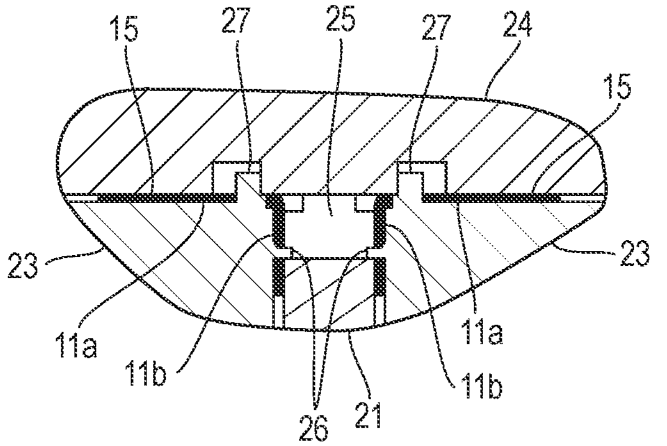
PRIOR ART FIG. 3(b)
Figure 4:
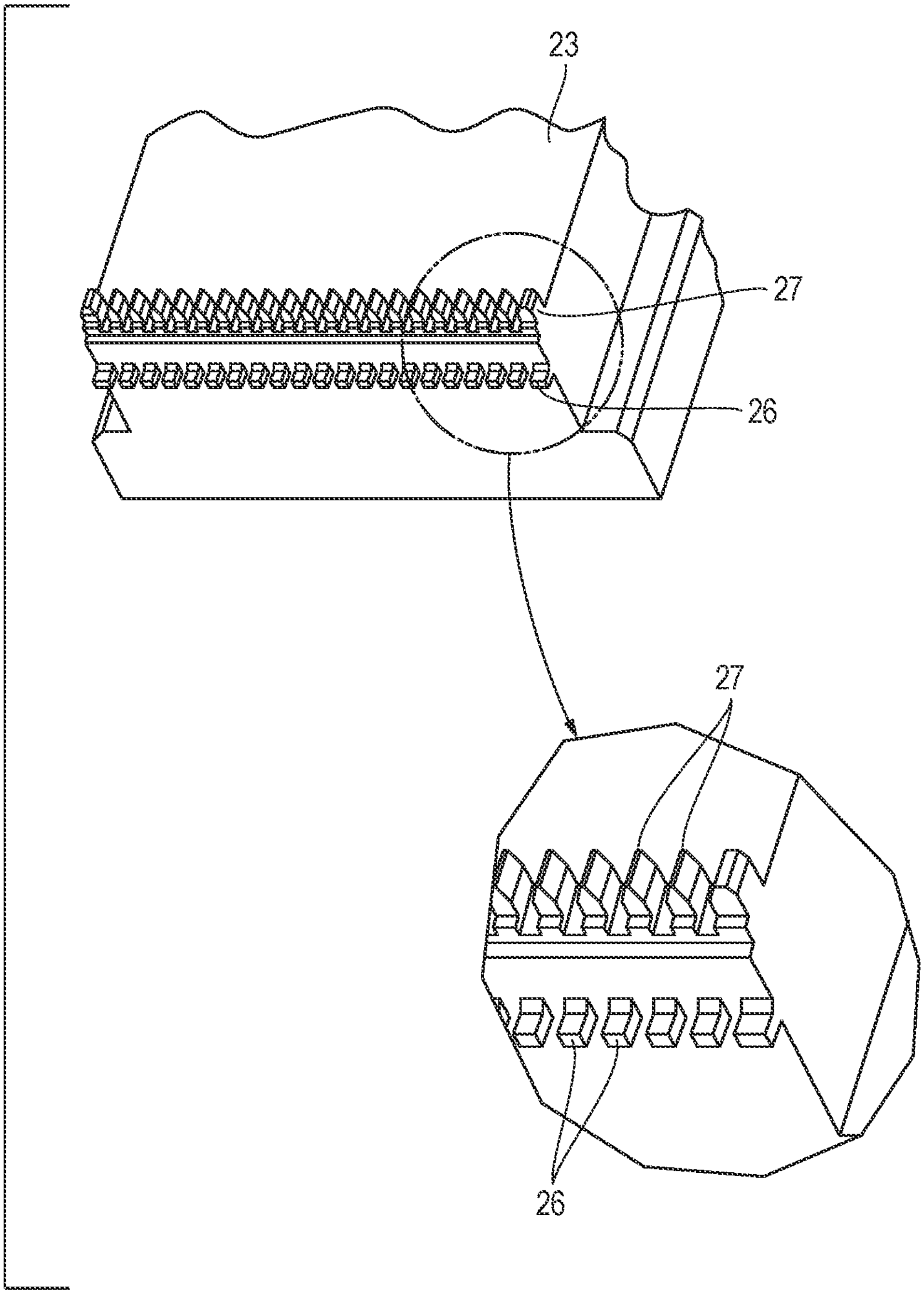
PRIOR ART FIG. 4
FIG. 4 is a perspective view showing key features of a sliding die plate from FIG. 3(*a*).
Figures 5A, 5B:
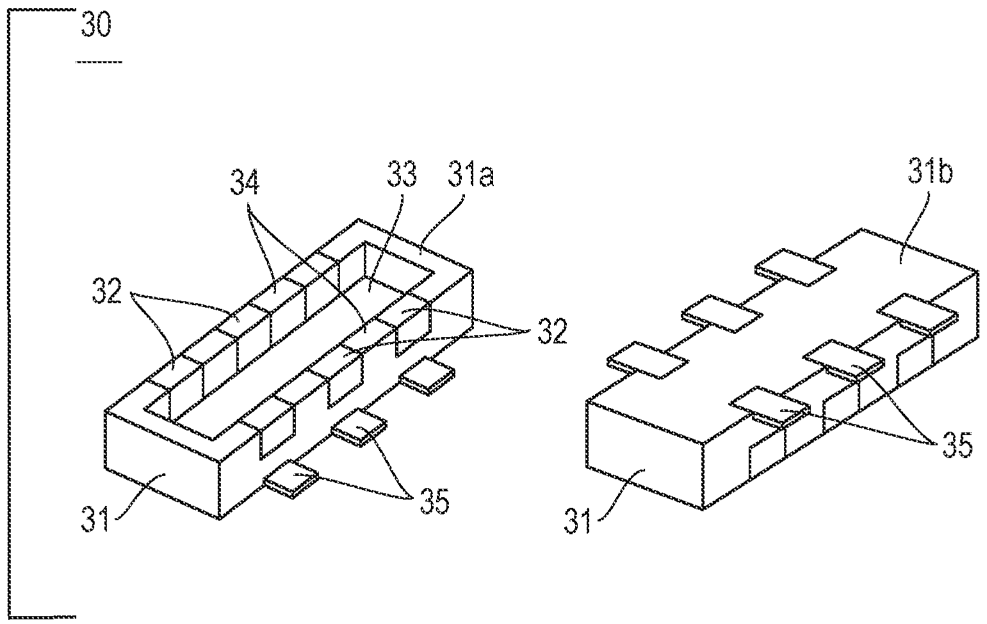
FIG. 5(a) RELATED ART
FIG. 5(*a*) is a perspective view showing a general structure of a conventional connector as an example of an electronic component, and FIG. 5(*b*) is a perspective view of the connector shown in FIG. 5(*a*) as turned upside down.
Figure 6A:
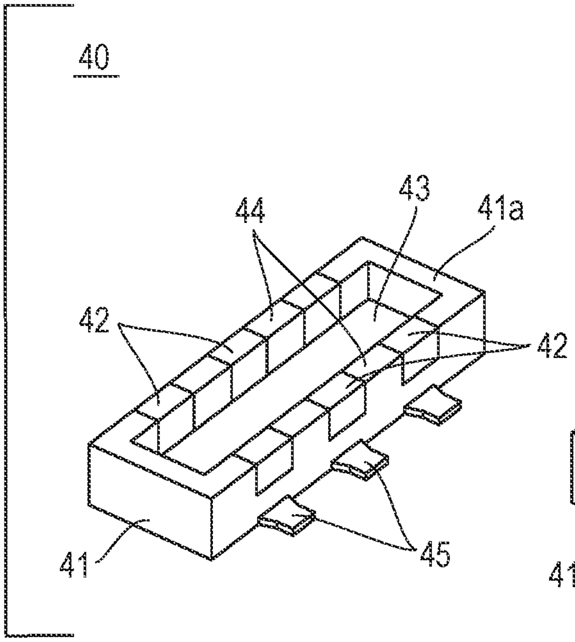
FIG. 6(*a*) is a perspective view showing a general structure of a first example of a connector as an example of an electronic component according an embodiment, and FIG. 6(*b*) is a perspective view of the connector shown in FIG. 6(*a*) as turned upside down.
Figure 6B:
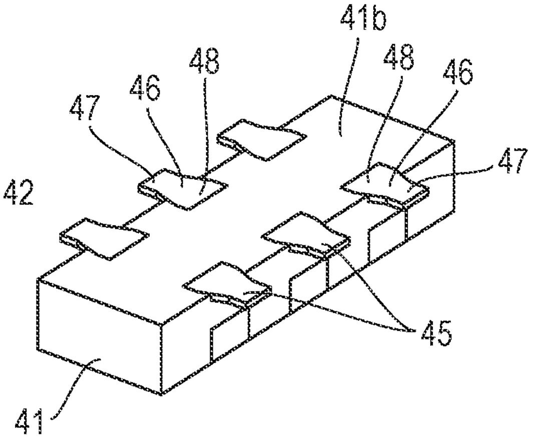

FIGS. 5 and 6 each show a general structure of a connector as an example of the electronic component to which the present embodiment is directed. FIG. 6 shows a connector 40 according to the present embodiment and FIG. 5 shows a connector 30 of a conventional structure shown as comparison to FIG. 6. The connector 30, 40 serves one of a pair of board-to-board connectors and is intended to be surface-mounted on a substrate.

The connector 30 is formed from a housing 31 made of resin and a total of six terminals 32 arranged in two rows. The housing 31 is rectangular parallelepiped shaped, with a recess 33 formed in an upper surface 31*a*. One end side of each terminal 32 is embedded in one of side walls 34, which are situated across the recess 33, so as to run down the side wall 34, while the other end side sits on a bottom surface 31*b* of the housing 31 and protrudes from the housing 31. The portion of the terminal 32 that protrudes from the housing 31 forms a connection portion 35. In the connector 30, the portion of the terminal 32 that lies on the bottom surface 31*b* of the housing 31, including the connection portion 35, is in a simple rectangular shape.

Meanwhile, the connector 40 according to the present embodiment is, as with the connector 30, formed from a housing 41 made of resin and a total of six terminals 42 arranged in two rows. One end side of each terminal 42 is embedded in one of side walls 44 situated across a recess 43 which is formed in an upper surface 41*a* of the housing 41 of a rectangular parallelepiped shape, while the other end side sits on a bottom surface 41*b* of the housing 41 and protrudes from the housing 41, as with the connector 30. However, the portion of the terminal 42 that lies on the bottom surface 41*b* of the housing 41 has a different shape from that of the connector 30.

Specifically, in this example, the other end side of each terminal 42 lying on the bottom surface 41*b* of the housing 41 consists of a tapered portion 46 having a tapered width, an extension portion 47 extending from a narrow-side distal end of the tapered portion 46, and a basal portion 48 continuous from a wide-side proximal end of the tapered portion 46. Part of the tapered portion 46 and the extension portion 47 protrude from the housing 41, while the remaining portion of the tapered portion 46 and the basal portion 48 are embedded in the housing 41. In this example, a connection portion 45 protruding from the housing 41 is formed of a part of the tapered portion 46 and the extension portion 47.

Figure 7:
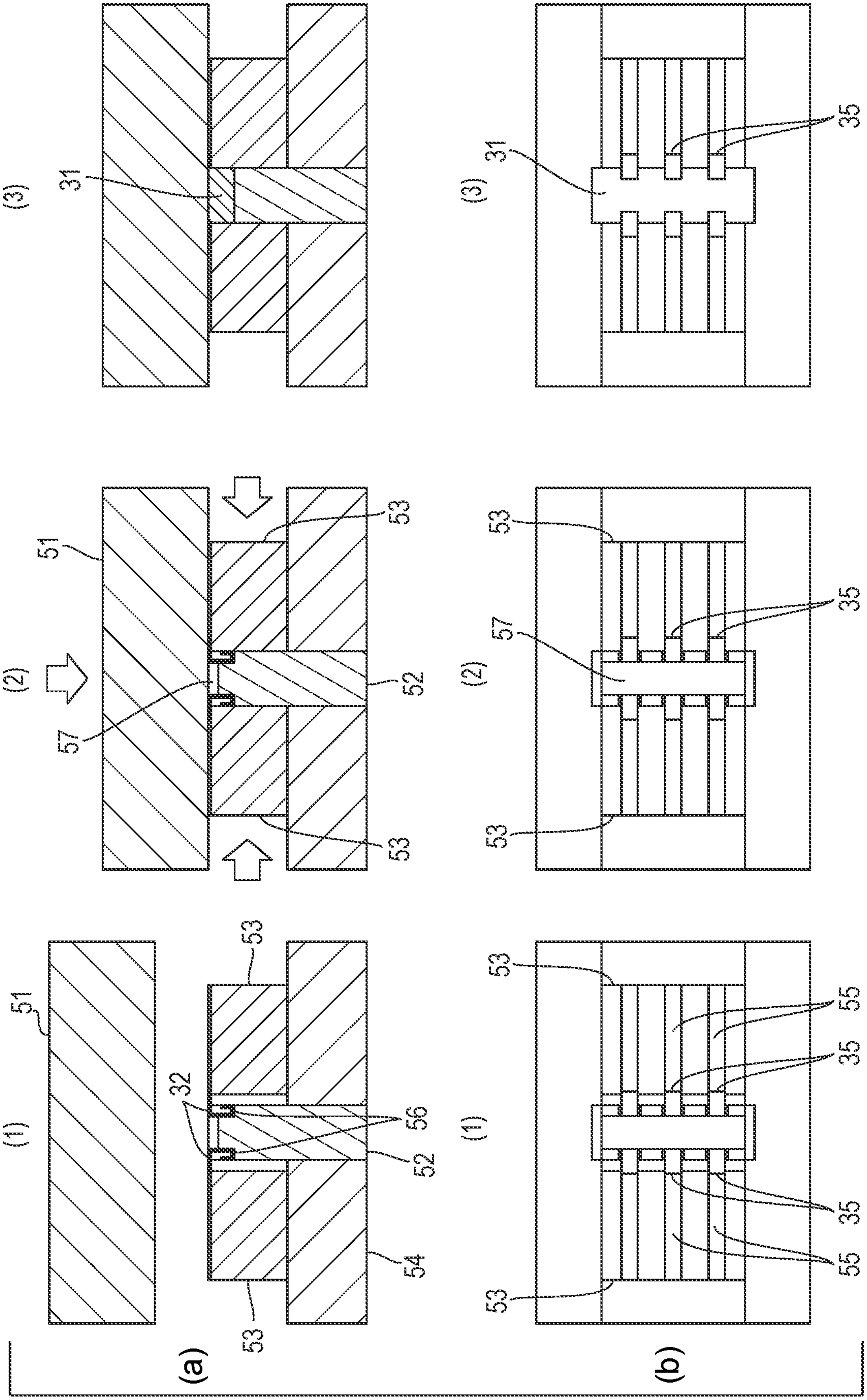
FIG. 7 illustrates a method of manufacture that involves insert-molding of terminals on a housing.

For the aforementioned connector 30, the terminals 32 are structured by being insert-molded on the housing 31, and for the connector 40, the terminals 42 are also structured by being insert-molded on the housing 41. FIG. 7 shows a method of manufacture by means of such insert molding for the manufacture of the connector 30 as an example.

The forming mold in this example consists of an upper die (first die) 51, a lower die 52, and two sliding dies (second dies) 53, where the lower die 52 is housed and supported in a base 54 and protrudes from the base 54, and the two sliding dies 53 are slidable on the base 54. The illustrations (1) to (3) in FIG. 7 indicate states in the insert molding process in sequence, and FIG. 7(*b*) shows states as seen from a direction in which the upper die 51 lies, with the illustration of the upper die 51 omitted. In one surface (upper surface) of each of the two sliding dies 53, grooves 55 for housing and positioning the connection portions 35 of the terminals 32 are formed. On an upper surface of the lower die 52, there are formed step portions 56, on which the end portions of the terminals 32 opposite the connection portions 35 are placed. The insert molding process is described below in sequence.

(1) The sliding dies 53 on the right and left of the lower die 52, respectively, are apart from the lower die 52 in this state, and the upper die 51 lying above the sliding dies 53 is also apart from the sliding dies 53. In this state, the terminals 32 are inserted and parts of the connection portions 35 (on distal end side) are housed and positioned in the grooves 55 of the sliding dies 53. While the three terminals 32 on each of the right and left sides are respectively supported on and integrated with carriers, the carriers are not illustrated in this example.

(2) The sliding dies 53 are slid into close contact with the lower die 52, the upper die 51 is lowered into close contact with the sliding dies 53, and the mold is pressed to form a cavity 57. The operation of sliding the sliding dies 53 and the operation of lowering the upper die 51 are performed in coordination.

(3) Resin is injected into the cavity 57 and the housing 31 is formed by injection molding.

This completes the insert molding, upon which the mold is opened and the carriers not illustrated are cut and removed, so that the connector 30 is complete.

Here, before describing the method of manufacturing the connector 40 according to the present embodiment, how resin leakage can occur to create resin burrs at the connection portions 35 of the terminals 32 in the manufacture of the connector 30 of the conventional structure, which is insert-molded as mentioned above, is described with reference to FIG. 8.

Figure 8A:
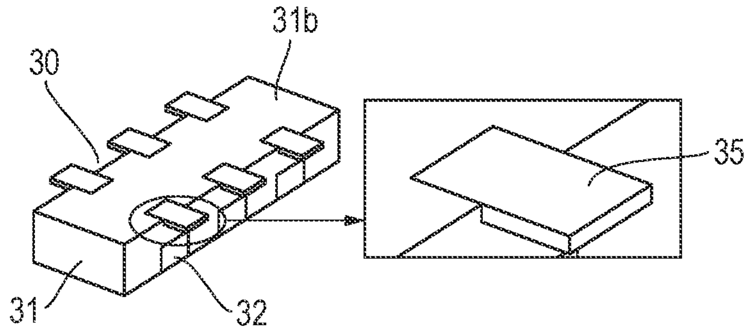
RELATED ART FIG. 8(a)
FIG. 8(*a*) is a perspective view showing the connector shown in FIG. 5(*b*) and a partial enlargement of it, and FIG. 8(*b*) illustrates the method of manufacturing the connector shown in FIG. 8(*a*).
Figure 8B:
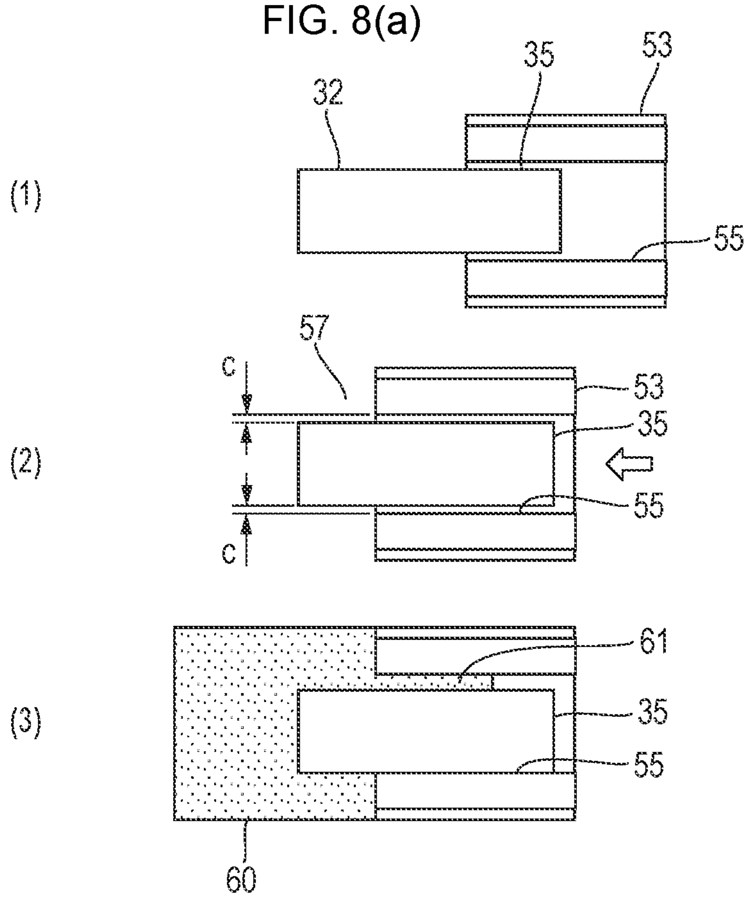
RELATED ART FIG. 8(b)

Illustrations (1) to (3) in FIG. 8(*b*) show the relation between the connection portion 35 of a terminal 32 and a sliding die 53 and how resin leakage occurs in the portion in which the connection portion 35 of one terminal 32 of the connector 30 lies, which is shown in FIG. 8(*a*) in enlarged view. Illustrations (1) to (3) in FIG. 8(*b*) correspond to (1) to (3) of the insert molding process shown in FIG. 7. In (3) of FIG. 8(*b*), 60 indicates the resin to form the housing 31.

In a state when the sliding die 53 has been slid and the mold is pressed, a clearance c still exists between the groove 55 of the sliding die 53 and the connection portion 35 of the terminal 32. Thus, this clearance c causes resin leakage and the leaked resin form resin burrs 61, which adheres to the connection portion 35 and will remain on it. The state shown in (3) of FIG. 8(*b*) is when the connection portion 35 deviates to one side (is decentered) with respect to the groove 55.

Figure 9A:
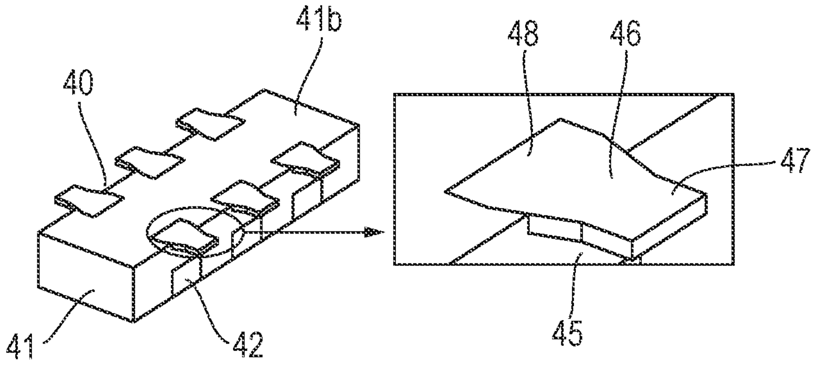
FIG. 9(*a*) is a perspective view showing the connector shown in FIG. 6(*b*) and a partial enlargement of it, and FIG. 9(*b*) illustrates the method of manufacturing the connector shown in FIG. 9(*a*).
Figure 9B:
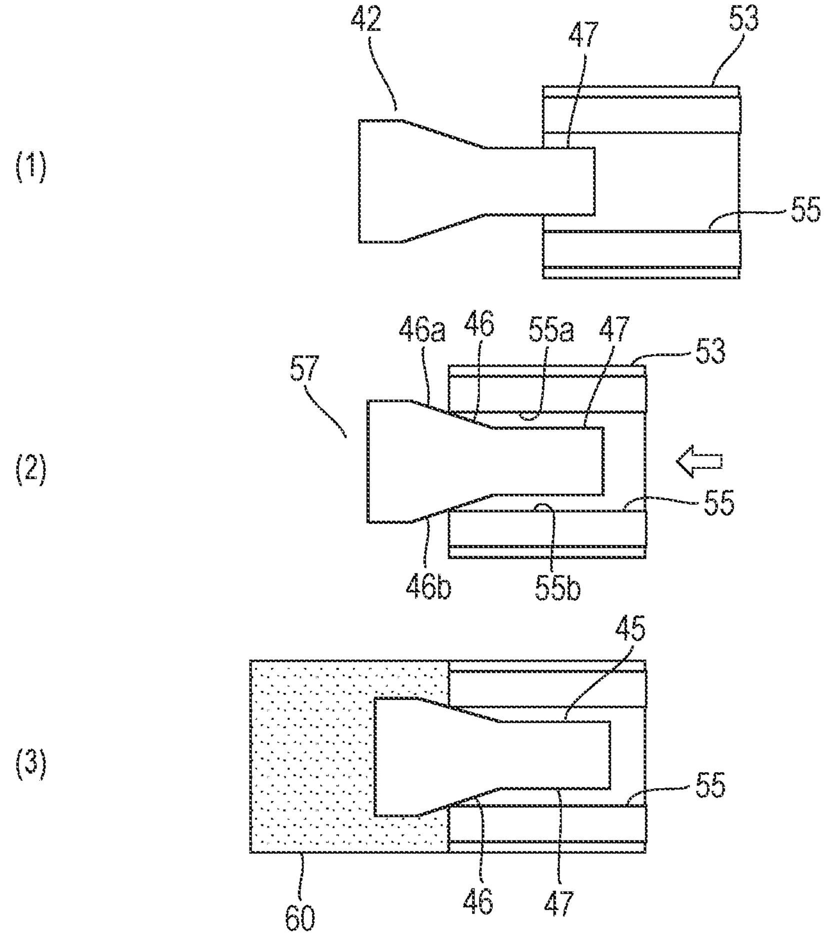
Figure 10A:
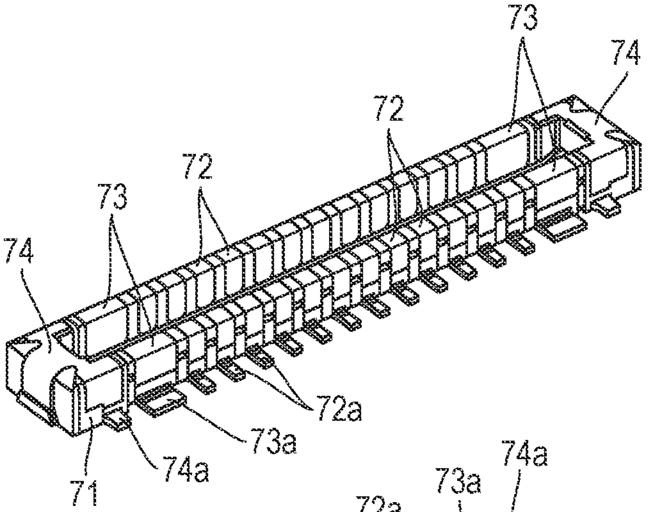
FIG. 10(*a*) is a perspective view showing a second example of the connector as the electronic component according to the embodiment, FIG. 10(*b*) is a perspective view of the connector shown in FIG. 10(*a*) as turned upside down, FIG. 10(*c*) is a partial enlarged view of FIG. 10(*b*), and FIG. 10(*d*) is a partial enlarged plan view of FIG. 10(*c*).
Figure 10B:
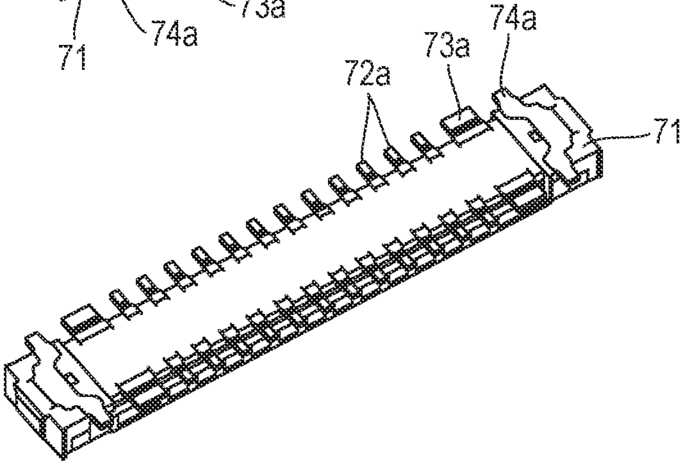
Figure 10C:
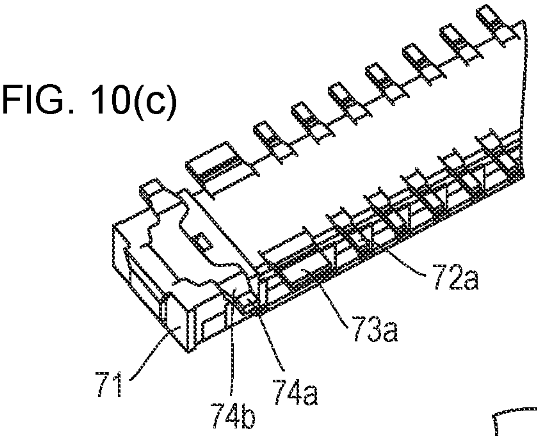
Figure 10D:
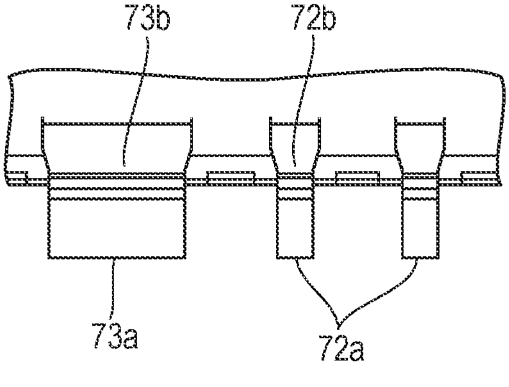

In contrast, FIG. 9 shows how resin leakage can be prevented, that is, formation of resin burrs can be reduced, in the method of manufacturing the connector 40 according to the present embodiment in comparison to FIG. 8. The molding steps shown in (1) to (3) of FIG. 9(*b*) are described in sequence below.

(1) The terminal 42 is inserted into the forming mold and the extension portion 47 of the terminal 42 is positioned in the groove 55 of the sliding die 53.

(2) The sliding die 53 is slid, that is, the sliding die 53 is slid relative to the extension portion 47, and the tip edges of opposite side surfaces 55*a*, 55*b* of the groove 55 facing the cavity 57 are made to abut against opposite side surfaces 46*a*, 46*b* that form the tapering of the tapered portion 46 of the terminal 42. As the sliding die 53 is slid, the upper die 51 also lowers into a mold pressing state (see (2) of FIGS. 7(*a*) and (2) of FIG. 7(*b*)).

In the mold pressing state, the upper die 51 is in close contact with the upper surface of the sliding die 53, and the connection portion 45, which is formed of part of the tapered portion 46 of the terminal 42 and the extension portion 47 lying in the groove 55 of the sliding die 53, is held between the bottom surface of the groove 55 and the upper die 51. The remaining portion of the tapered portion 46 and the basal portion 48 lie in the cavity 57.

(3) Resin 60 is injected into the cavity 57 and molded. Since the tip edges of the opposite side surfaces 55*a*, 55*b* of the groove 55 facing the cavity 57 abut against the opposite side surfaces 46*a*, 46*b* of the tapered portion 46 of the terminal 42, the resin 60 is checked and no resin leakage occurs, that is, no resin burr is created at the connection portion 45.

While the present embodiment has been described taking the connector 40 as an example, examples that can prevent resin leakage during insert molding to reduce the formation of resin burrs by thus constructing the connection portion of each terminal protruding from the housing with a part of the tapered portion and the extension portion are further described with reference to FIGS. 10 to 12.

FIG. 10 shows a connector 70 for surface mounting on a substrate, as with the connector 40 shown in FIG. 6. On the connector 70, terminals 72 for signals and terminals 73 for power supply are insert-molded on a housing 71 and further reinforcement fittings 74 are insert-molded as well. The terminals 72, 73 and the reinforcement fittings 74 all have connection portions 72*a*, 73*a*, 74*a* protruding from the housing 71, and these connection portions 72*a*, 73*a*, 74*a* are soldered to lands on a substrate. In this example, the connection portions 72*a*, 73*a*, 74*a* all have the same shape as that of the connection portions 45 of the connector 40. In FIGS. 10(*c*) and 10(*d*), 72*b*, 73*b*, and 74*b* indicate tapered portions, respectively.

Figure 11A:
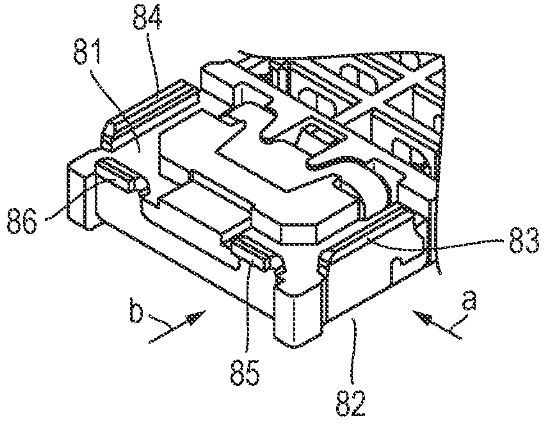
FIG. 11(*a*) is a perspective view showing an end portion of a third example of the connector as the electronic component according to the embodiment, FIG. 11(*b*) is a partial enlarged side view of FIG. 11(*a*) as seen from the direction of arrow a, and FIG. 11(*c*) is a partial enlarged front view of FIG. 11(*a*) as seen from the direction of arrow b.
Figure 11B:
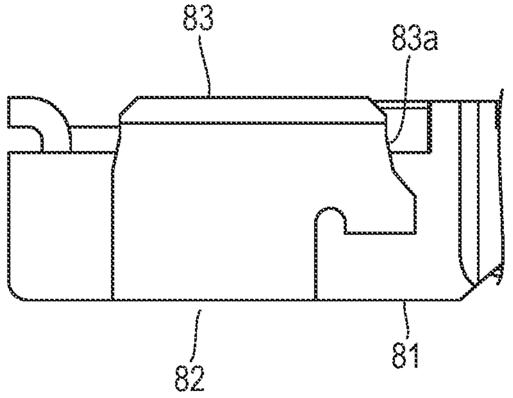
Figure 11C:
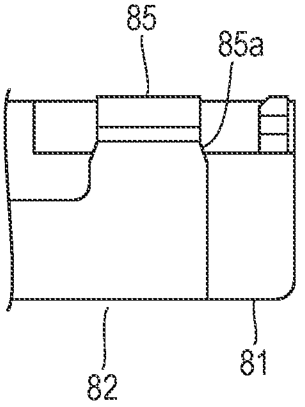

FIG. 11 shows a portion at an end portion of a connector 80 in which a reinforcement fitting 82 is insert-molded on a housing 81. The reinforcement fitting 82 has connection portions 83 to 86 protruding from the housing 81, and the connection portions 83 to 86 are soldered to lands on a substrate. The connection portions 83 to 86 all have the same shape as that of the connection portions 45 of the connector 40. In FIGS. 11(*b*) and 11(*c*), 83*a* and 85*a* indicate tapered portions, respectively.

Figure 12A:
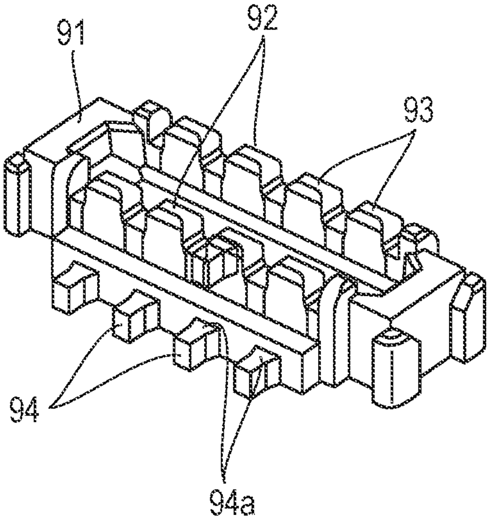
FIG. 12(*a*) is a perspective view showing a fourth example of the connector as the electronic component according to the embodiment, and FIG. 12(*b*) is a partial enlarged side view of FIG. 12(*a*).
Figure 12B:
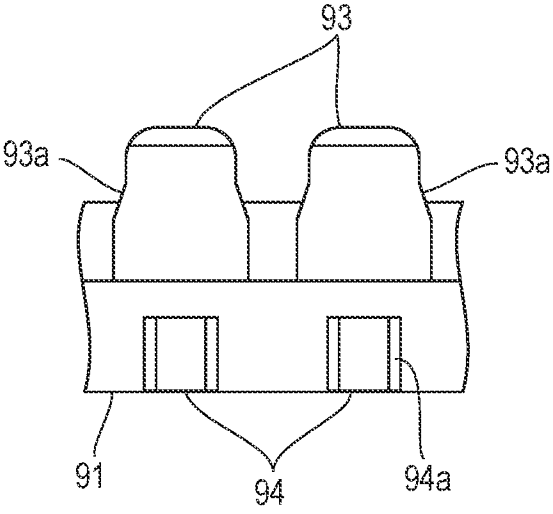

FIG. 12 shows a connector 90 with both ends of a terminal 92 insert-molded on a housing 91 projecting from the housing 91. A connection portion 93 protruding vertically from the housing 91 serves as a point of fitting and contact with a terminal of the mating connector, while a connection portion 94 protruding horizontally from the housing 91 serves as a point of soldering to a land on a substrate. The connection portions 93, 94 all have the same shape as that of the connection portions 45 of the connector 40. In FIGS. 12, 93*a* and 94*a* indicate tapered portions, respectively.

While different examples have been described, the electronic component to which the embodiment is directed is not limited to a connector but can be any device that has terminals insert-molded on the housing and connection portions protruding from the housing provided at the terminals.

The method of manufacturing an electronic component according to the embodiment can provide the following effects.

1) Resin leakage during the insert molding of terminals on the housing can be prevented, and hence occurrence of disadvantages such as resin burrs forming at the connection portions of the terminals protruding from the housing due to resin leakage can be eliminated.

2) By having the tapered portion, the connection portion of each terminal is centered in a groove of a sliding die as shown in FIG. 9 during sliding of the sliding dies (mold pressing). Thus, the positional accuracy of the connection portions can be increased, which is also advantageous for narrower pitches.

3) When the terminals are inserted into the forming mold and the connection portions of the terminals are positioned in the grooves of the sliding dies, the extension portions defining a larger clearance from the groove are positioned, so that insertability is not compromised.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of manufacturing an electronic component having a housing with terminals insert-molded thereon, in which each of the terminals includes a tapered portion having a tapered width and an extension portion extending from a narrow-side distal end of the tapered portion, and a mold defining a cavity for molding the housing includes a first die and second dies, the method comprising:

after positioning the extension portion in one of grooves formed in one surface of each of the second dies, sliding the second dies relative to the extension portion to make tip edges of opposite side surfaces of the groove facing the cavity abut against opposite side surfaces that form tapering of the tapered portion; and performing molding while keeping the first die in close contact with the one surface and keeping part of the tapered portion having the tapered width and the extension portion lying in the groove held between a bottom surface of the groove and the first die, with a remaining portion of the tapered portion having the tapered width lying in the cavity, thus forming a connection portion protruding from the housing with the part of the tapered portion having the tapered width and the extension portion and embedding, by the insert-molding, both side surfaces of the remaining portion in the housing, such that the both side surfaces of the remaining portion are in direct contact with the housing.

2. The method of manufacturing an electronic component according to claim 1, wherein the connection portion is a point of soldering to a land on a substrate or a point of contact with a terminal of a mating electronic component.

3. An electronic component having a housing with terminals insert-molded thereon, wherein each of the terminals includes a tapered portion having a tapered width and an extension portion extending from a narrow-side distal end of the tapered portion, part of the tapered portion having the tapered width and the extension portion protrude from the housing to form a connection portion, and a remaining portion of the tapered portion having the tapered width is embedded, by the insert-molding, in the housing with both side surfaces in direct contact with the housing.

4. The electronic component according to claim 3, wherein the connection portion is a point of soldering to a land on a substrate or a point of contact with a terminal of a mating electronic component.

* * * * *